(No Model.)

W. A. SHORT.
WIRE TIGHTENER.

No. 595,213.

Patented Dec. 7, 1897.

Witnesses.

Inventor.
William A. Short.
By James L. Norris
Atty.

UNITED STATES PATENT OFFICE.

WILLIAM A. SHORT, OF BAIRD, TEXAS, ASSIGNOR OF ONE-HALF TO B. L. RUSSELL, OF SAME PLACE.

WIRE-TIGHTENER.

SPECIFICATION forming part of Letters Patent No. 595,213, dated December 7, 1897.

Application filed May 20, 1897. Serial No. 637,431. (No model.)

*To all whom it may concern:*

Be it known that I, WILLIAM A. SHORT, a citizen of the United States, residing at Baird, in the county of Callahan and State of Texas, have invented new and useful Improvements in Wire-Tighteners, of which the following is a specification.

This invention relates to wire-tighteners, and has for its object to provide an improved and easily-operated implement for use in tightening and securing the slackened wires of an already-built wire fence.

The invention consists in features of construction and novel combinations of parts in a wire-tightening device for repairing wire fences and attaching wires to fence-posts, as hereinafter described and claimed.

Figure 1:
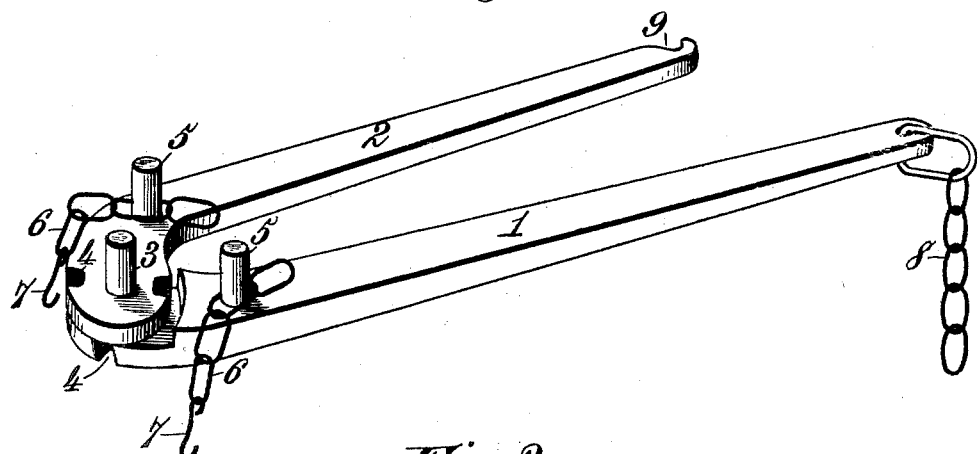
Figure 2:
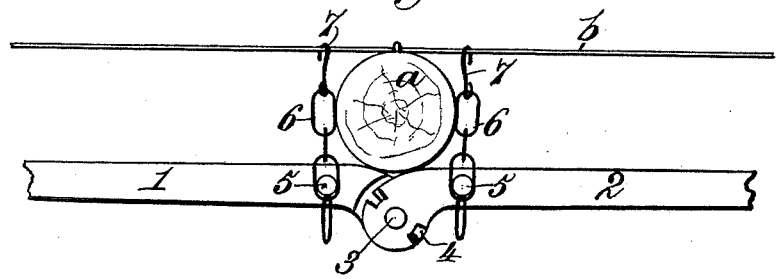
Figure 3:
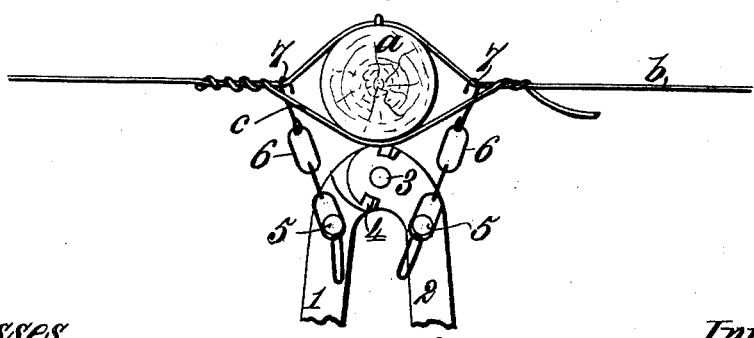
Figure 4:

In the annexed drawings, Figure 1 is a view of my improved wire-tightener. Fig. 2 shows the position of the wire-tightening implement as applied against the post of a wire fence, with the arms of the implement extended parallel to the fence and the hooks engaged with a wire to be tightened. Fig. 3 shows the position of the implement after the pull has been made on the slackened fence-wire to draw it partly around the post and so that a tie-wire can be attached for securing the fence-wire to the post without requiring the use of staples. Fig. 4 shows the manner of using the implement to tighten a fence-wire at a point between two fence-posts.

The reference-numerals 1 and 2 designate two arms that are substantially alike and the counterpart of each other. At one end these arms are curved toward each other and suitably constructed for connection by means of a joint-pin or pivot 3, one end of which is extended upward for a purpose to be presently explained. In the pivotal ends of the arms 1 and 2 are formed cutter-edged notches 4, to engage a wire that may require cutting, the said notches or cutters 4 of the opposing arms being adapted to register when the arms are partly extended. If the cutters 4 are engaged with a wire and a proper movement given to the arms 1 and 2, the wire can be readily cut.

There is provided on each arm 1 and 2, near its pivotal end, an upwardly-projecting pin 5 for attachment of chains 6 by slipping any link of the chain over and onto its attaching-pin, thereby providing for lengthening or shortening the chains, as may be required. One end of each chain 6 is provided with a hook 7, to be engaged with a fence-wire that requires tightening.

Thus to tighten a slackened wire of a fence the pivotal end or heel of the wire-tightening implement will be placed against a fence-post *a* and the arms 1 and 2 extended, as shown in Fig. 2. The hooks 7 will then be caught onto the slackened fence-wire *b* at opposite sides of the post, and by now drawing the arms 1 and 2 toward each other a portion of the wire *b* will be pulled partly around the fence-post *a*, as shown in Fig. 3, the fence-post and the heel of the implement serving as a fulcrum from which the device is operated. In this closed or partly-closed position of the arms 1 and 2 they can be held securely by means of a chain 8, that is fastened to the free end of one of said arms, any one of the links in said chain being adapted to engage over the end of the other arm and into a notch 9 therein. While the arms 1 and 2 are thus held together, drawing the fence-wire (by means of chains 6 and hooks 7) partly around the fence-post, a tie-wire *c*, Fig. 3, will be engaged with the wire *b* and extended around the post on the side opposite to that occupied by the tightened main wire.

By a suitable adjustment of the chains 6 on the pins 5 the operating length of said chains can be increased or diminished to obtain their full straining effect without impairment from variations of diameter in the fence-posts or differences in slackness of the wires to be tightened. As the closed tightening implement with its chains 6 and hooks 7 will hold the strained wire *b* firmly, the tie-wire *c* can be readily made secure to the main wire and fence-post without requiring the use of staples.

After the wire *b* has been tightened and secured at one post the hooks 7 can be disengaged from the wire, and the operation of the implement may then be repeated at another post.

If it is desired to tighten slackened wires at a point intermediate to the posts of a wire fence, the arms 1 and 2 of the wire-tightener may be extended and the slackened fence-wire be engaged between the upwardly-projecting pin 3 on one side and the upwardly-projecting pins 5 5 on the other side. By now closing the arms 1 and 2 together the engaged portion of the slack fence-wire will be drawn by the pins 5 5 into a loop that can be readily tied by the splice-wire c the same as around the post.

The notches 4 at one end of the implement or the notch 9 at the other end can be employed to extract old staples from a post, if desired, for the tie-wire c takes the place of a staple.

What I claim as my invention is—

1. The herein-described wire-tightener consisting of two arms pivoted together at one end and provided with upwardly-projecting pins, chains attached to said pins and carrying hooks to be engaged with a slackened fence-wire at opposite sides of a fence-post, the heel or pivotal end of the implement being adapted to bear against the said fence-post and serve therewith as a fulcrum, whereby the closing together of the implement-arms will strain the fence-wire partly around the fence-post, and means attached to the free ends of said arms for holding them in closed or partly-closed position to permit attachment of the strained fence-wire to the fence-post, substantially as specified.

2. The herein-described wire-tightener consisting of two arms pivoted together at one end and provided with the described upwardly-projecting pins, chains adjustably attached to two of said pins and carrying hooks to be engaged with a fence-wire, and a fastening device adapted to secure together the free ends of the closed arms, substantially as specified.

In testimony whereof I have hereunto set my hand in presence of two subscribing witnesses.

WILLIAM A. SHORT.

Witnesses:
W. P. COCHRAN,
W. W. DUNSON.